United States Patent
Tilley et al.

(10) Patent No.: US 11,473,899 B2
(45) Date of Patent: Oct. 18, 2022

(54) SYSTEM AND METHOD FOR DIMENSIONING OBJECTS

(71) Applicant: ZEBRA TECHNOLOGIES CORPORATION, Lincolnshire, IL (US)

(72) Inventors: Patrick B. Tilley, Coram, NY (US); Seth David Silk, Barrington, IL (US); Raghavendra Tenkasi Shankar, Holbrook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 2 days.

(21) Appl. No.: 16/885,550

(22) Filed: May 28, 2020

(65) Prior Publication Data

US 2021/0372771 A1 Dec. 2, 2021

(51) Int. Cl.
*G01B 11/02* (2006.01)
*G06T 7/62* (2017.01)
*G06V 20/64* (2022.01)

(52) U.S. Cl.
CPC .............. *G01B 11/024* (2013.01); *G06T 7/62* (2017.01); *G06V 20/64* (2022.01); *G06T 2207/10012* (2013.01)

(58) Field of Classification Search
CPC ...... G01B 11/024; G06T 7/62; G06K 9/00201
See application file for complete search history.

(56) References Cited

U.S. PATENT DOCUMENTS

| | | | |
|---|---|---|---|
| 2014/0104416 A1 | 4/2014 | Giordano et al. | |
| 2015/0213647 A1* | 7/2015 | Laffargue | G06T 17/20 345/520 |
| 2018/0106596 A1* | 4/2018 | Ackley | G01B 11/00 |

OTHER PUBLICATIONS

International Search Report and Written Opinion for International Application No. PCT/US2021/033725 dated Sep. 9, 2021.

* cited by examiner

*Primary Examiner* — Myron Wyche

(57) ABSTRACT

A computing device for dimensioning an object includes: a dimensioning subsystem configured to execute a default dimensioning method and a backup dimensioning method; a memory storing quality evaluation rules; a processor connected with the dimensioning subsystem and the memory, the processor configured to: control the dimensioning subsystem to execute a default dimensioning method to obtain default dimensioning data; compare a quality metric for the default dimensioning data to a threshold condition defined in the quality evaluation rules; when the quality metric exceeds the threshold condition, compute dimensions of the object based on the default dimensioning data; and when the quality metric does not exceed the threshold condition, control the dimensioning subsystem to execute the backup dimensioning method to obtain backup dimensioning data and compute the dimensions of the object based on the backup dimensioning data.

31 Claims, 5 Drawing Sheets

SYSTEM AND METHOD FOR DIMENSIONING OBJECTS

BACKGROUND

Determining the dimensions of objects may be necessary in a wide variety of applications. For example, it may be desirable to determine the dimensions of packages in a warehouse prior to shipping. Certain dimensioning methods may not be suitable for dimensioning certain types of objects.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
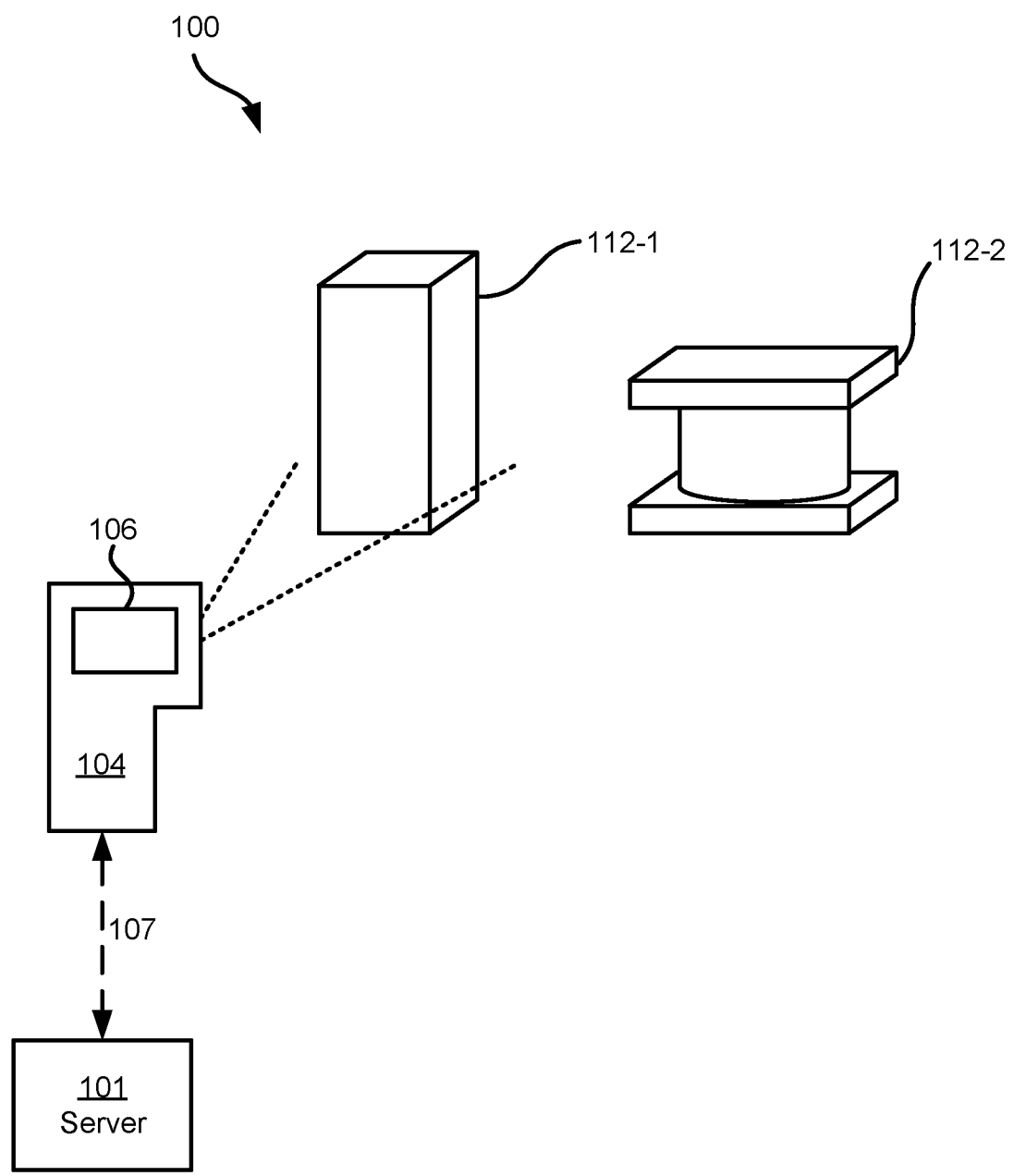
FIG. 1 is a schematic diagram of an example dimensioning system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device for dimensioning an object. The computing device includes: a dimensioning subsystem capable of executing a default dimensioning method and a backup dimensioning method; a memory storing quality evaluation rules; a processor connected with the dimensioning subsystem and the memory, the processor configured to: control the dimensioning subsystem to execute a default dimensioning method to obtain default dimensioning data; compute a quality metric for the default dimensioning data; when the quality metric exceeds a threshold condition defined in the quality evaluation rules, compute dimensions of the object based on the default dimensioning data; and when the quality metric does not exceed the threshold condition, control the dimensioning subsystem to execute the backup dimensioning method to obtain backup dimensioning data and compute the dimensions of the object based on the backup dimensioning data.

Additional examples disclosed herein are directed to a method for dimensioning an object. The method comprises: storing quality evaluation rules; controlling a dimensioning subsystem of a dimensioning device to execute a default dimensioning method to obtain default dimensioning data; comparing a quality metric for the default dimensioning data to a threshold condition defined in the quality evaluation rules; when the quality metric exceeds the threshold condition, computing dimensions of the object based on the default dimensioning data; and when the quality metric does not exceed the threshold condition, controlling the dimensioning subsystem to execute the backup dimensioning method to obtain backup dimensioning data; and computing the dimensions of the object based on the backup dimensioning data.

Additional examples disclosed herein are directed to a method for dimensioning an object. The method comprises: storing quality evaluation rules; controlling a dimensioning subsystem of a dimensioning device to execute a default dimensioning method to obtain default dimensioning data; comparing a quality metrics for the default dimensioning data to a threshold condition defined in the quality evaluation rules; and selecting one of the default dimensioning method and a backup dimensioning method to compute dimensions of the object based on comparing the quality metrics to the threshold condition.

FIG. 1 depicts a dimensioning system 100 in accordance with the teachings of this disclosure. The system 100 includes a server 101 in communication with a computing device 104 (also referred to herein as the dimensioning device 104 or simply the device 104) via a communication link 107, illustrated in the present example as including wireless links. For example, the link 107 may be provided by a wireless local area network (WLAN) deployed by one or more access points (not shown). In other examples, the server 101 is located remotely from the device 104 and the link 107 may therefore include one or more wide-area networks such as the Internet, mobile networks, and the like.

The system 100, and more particularly, the device 104, is deployed to dimension one or more objects 112-1 and 112-2. For example, the objects 112 may be items, such as boxes or other packages, in a transport and logistics facility. As can be seen, the object 112-1 is a regular box defined by a length/depth, width, and height, while the object 112-2 is has a non-uniform structure. Some dimensioning methods, such as an aim-and-click stereoscopic dimensioning method, may be able to quickly and accurately dimension regular objects, such as the object 112-1. More complex objects, such as the object 112-2 may be challenging for the stereoscopic dimensioning method, and hence may warrant a different dimensioning which is more reliable for dimensioning irregularly shaped objects. For example, an optical with odometry dimensioning method may be utilized to dimension the object 112-2.

Different dimensioning methods may be faster or more effective depending upon aspects of the given target object, such as the color, reflectivity, surface voids, shape (regular/irregular), stationary or moving in reference to the dimensioning device, and size of a given target object, distance to the target, or aspects of the surrounding environment (e.g., scene contrast, indoor, outdoor, ambient light intensity and/or dynamic range, free space around the target, floor color and texture and reflectivity, background or nearby objects, structures, walls), and hence more than one dimensioning method may be required to handle the full scope of encountered freight. When switching between dimensioning methods, it may be challenging for an operator to recognize conditions under which different dimensioning methods are to be used and to change the work process to accommodate the different dimensioning methods. A change in work process consists of the operator performing different actions for different dimensioning methods to enact different device-target object interaction sequences. For example, a device-target object interaction sequence associated with the default dimensioning method may entail an operator simply aiming at a target and capturing the dimensions whereas the alternative device-target object interaction sequence associated with a backup method may require the operator to physically interact with the dimension target. In an embodiment, to execute an alternate dimensioning method the operator may be alerted by the dimensioning device 104 that, rather than aiming the device at the object, an alternate device-target object interaction sequence is required. For instance, the user may be prompted by the dimensioning device 104 to move the device 104 along or in vicinity of one or more sides of the target object. Alternatively or in addition, the user may be prompted by the dimensioning device 104 to contact a corner of the target object in order to help establish a reference point of the object.

Accordingly, the device 104 includes a dimensioning subsystem 106 capable of executing a default dimensioning method and one or more backup dimensioning methods. Generally, the default dimensioning method may be relatively faster, computationally simpler, and/or simpler for an operator to operate during the dimensioning operation (i.e., a simpler device-target object interaction sequence) but may have one or more limitations or conditions under which the dimensioning operation is less reliable. The one or more backup dimensioning methods may be relatively slower, computationally more complex, and/or more complex for the operator to operate during the dimensioning operation (i.e., a more complex device-target object interaction sequence) but may be more robust under a greater variety of conditions. Further, in some examples, the dimensioning subsystem 106 may be capable of executing more than one backup dimensioning method.

For example, the default dimensioning method may be a stereoscopic-based dimensioning method with an aim-and-click operation. Stereoscopic-based dimensioning may be less reliable, for example, with an object such as the object 112-2 which has a non-uniform structure. An example backup dimensioning method may be an optical with odometry-based dimensioning method. The optical with odometry-based dimensioning method may require more time and effort and may more accurately capture the dimensions of the object 112-2 having a non-uniform structure. Other default and/or backup dimensioning methods are also contemplated. For example, the default and/or backup dimensioning methods may include structured light dimensioning methods, time-of-flight dimensioning methods, LiDAR, combinations of the above, and the like.

The dimensioning subsystem 106 may therefore include suitable hardware (e.g., emitters, image sensors, motion sensors, including accelerometers, gyroscopes, magnetometers, and the like) allowing the device 104 to execute the default dimensioning method and the one or more backup dimensioning methods. The specific components of the dimensioning subsystem 106 are selected based on the specific default and backup dimensioning methods to be executed in a dimensioning operation.

For example, the dimensioning subsystem 106 may include at least two image sensors configured to capture image data representing a target object to obtain a stereoscopic representation of the object for stereoscopic-based dimensioning. The dimensioning subsystem 106 may further include a tracking sensor configured to track successive poses of the device 104 for optical with odometry-based dimensioning.

In operation, the device 104 may automatically select a dimensioning method for dimensioning the target object. More particularly, during a dimensioning operation, the device 104 may execute the default dimensioning method and evaluate one or more quality metrics associated with the default dimensioning method. The default dimensioning method may be executed during a first device-target object interaction sequence associated with the default dimensioning method. The device 104 may then select one of the default dimensioning method and the backup dimensioning method to compute dimensions of the target object based on comparing the quality metrics to the threshold condition. For example, when the quality metrics associated with the default dimensioning method exceed a threshold condition, the device 104 may use the dimensioning data from execution of the default dimensioning method to dimension the target object. When the quality metrics associated with the default dimensioning method do not exceed the threshold condition, the device 104 may execute the backup dimensioning method and use the dimensioning data from execution of the backup dimensioning method to dimension the target object. The backup dimensioning method may be executed during an alternative device-target object interaction sequence associated with the backup dimensioning method. In some examples, to prompt the operator to execute the alternative device-target object interaction sequence, the device 104 may generate an alert indicating a change to the backup dimensioning method and the associated alternative device-target object interaction sequence. Thus, the device 104 may dimension a variety of objects, such as the objects 112-1 and 112-2 using one of the default dimensioning method or the backup dimensioning method.

Figure 2:
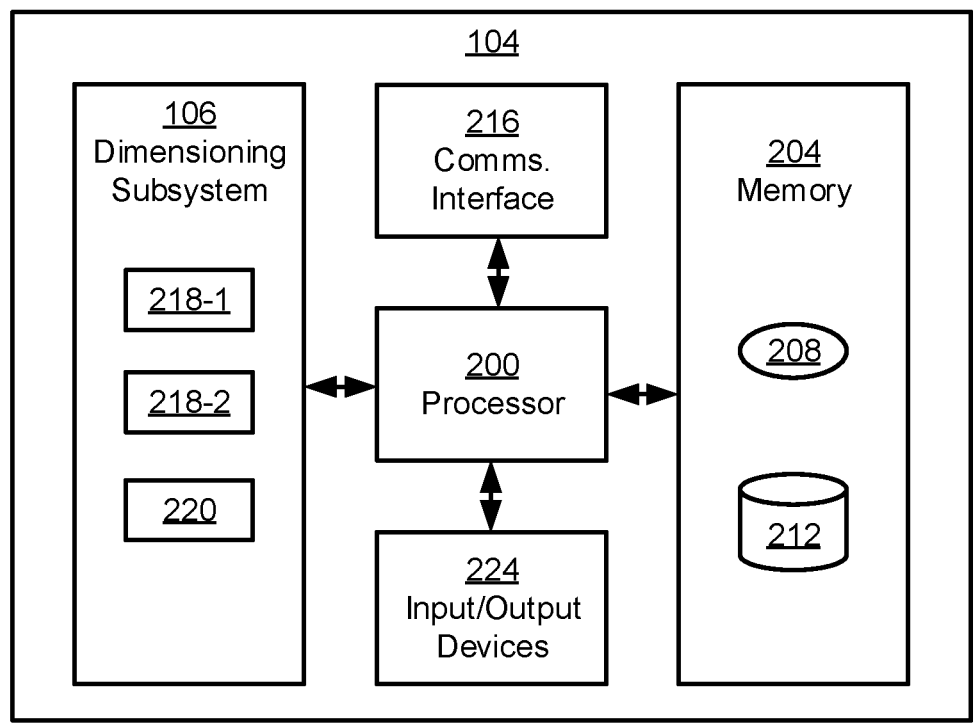
FIG. 2 is a block diagram illustrating certain internal components of the dimensioning device of FIG. 1.

Referring to FIG. 2, the mobile computing device 104, including certain internal components, is shown in greater detail. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores a control application 208 which, when executed by the processor 200, configures the processor 200 to perform various functions discussed below in greater detail and related to the dimensioning operation of the device 104. The application 208 may also be implemented as a suite of distinct applications. The processor 200, when so configured by the execution of the application 208, may also be referred to as a controller 200.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the dimensioning operations discussed herein.

The memory 204 also stores rules and data for the dimensioning operation. For example, the memory 204 may store quality evaluation rules for selecting a dimensioning method.

The device 104 also includes a communications interface 216 interconnected with the processor 200. The communications interface 216 includes suitable hardware (e.g. transmitters, receivers, network interface controllers and the like) allowing the device 104 to communicate with other computing devices—such as the server 101—via the link 107. The specific components of the communications interface 216 are selected based on the type of network or other links that the device 104 is to communicate over. The device 104 can be configured, for example, to communicate with the server 101 via the link 107 using the communications interface to send extracted target data to the server 101.

As shown in FIG. 2, the processor 200 is interconnected with the dimensioning subsystem 106. The processor 200 is enabled, via such connections, to issue commands for performing a dimensioning operation. Specifically, the processor 200 may control the dimensioning subsystem 106 to execute one of the dimensioning methods. As noted above, the dimensioning subsystem 106 includes suitable hardware allowing the device 104 to execute the default dimensioning method and the one or more backup dimensioning methods. In the present example, the dimensioning subsystem 106 includes two image sensors 218-1 and 218-2. The image sensors 218-1 and 218-2 may be color image sensors or other suitable sensors to capture image data for stereoscopic-based dimensioning. In the present example, the dimensioning subsystem 106 further includes a tracking sensor 220 configured to track successive poses of the device 104 for optical with odometry-based dimensioning. For example, the tracking sensor 220 may include a motion sensor, such as an accelerometer, a gyroscope, a magnetometer, or the like.

The processor 200 may also be connected to one or more input and/or output devices 224. The input devices 224 can include one or more buttons, keypads, touch-sensitive display screens or the like for receiving input from an operator, for example to initiate the dimensioning operation. The output devices 224 can further include one or more display screens, sound generators, vibrators, or the like for providing output or feedback to an operator, for example to output an indication of a change in dimensioning method, or to output the computed dimensions of the object.

Figure 3:
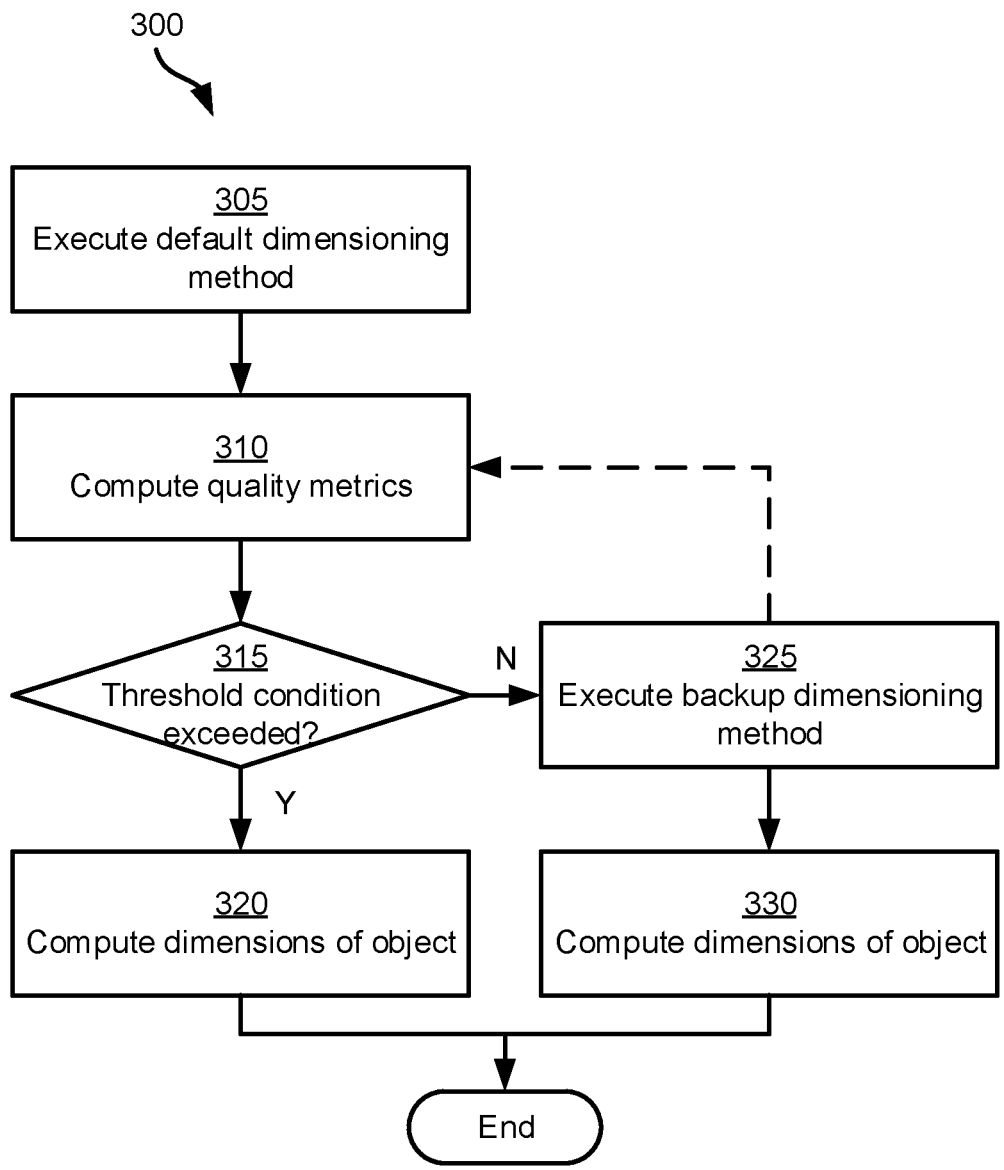
FIG. 3 is a flowchart of an example method of dimensioning objects in the system of FIG. 1.

The functionality of the device 104, as implemented via execution of the applications 208 by the processor 200 will now be described in greater detail, with reference to FIG. 3. FIG. 3 illustrates a method 300 of dimensioning an object, which will be described in conjunction with its performance in the system 100, and in particular by the device 104, with reference to the components illustrated in FIGS. 1 and 2. The method 300 will further be described when the device 104 employs a stereoscopic-based dimensioning method as the default dimensioning method and an optical with odometry-based dimensioning method as the backup dimensioning method. In other examples, the method 300 may be performed by other suitable computing devices, or with other suitable default and backup dimensioning methods.

The method 300 begins at block 305 in response to an initiation signal, such as an input at the input device 224. For example, an operator may activate a trigger button to initiate the method 300. At block 305, the device 104 is configured to execute the default dimensioning method to obtain default dimensioning data. More particularly, the default dimensioning method may be executed during the first device-target object interaction sequence. That is, in the present example, the device 104 is configured to execute the stereoscopic-based dimensioning method. The associated device-target object interaction sequence may be for the operator to simply aim the device 104 at the target object. Accordingly, the device 104 may control the image sensors 218 of the dimensioning subsystem 106 to capture image data representing the object. The device 104 may combine the image data captured from each of the image sensors 218 to obtain a stereoscopic representation of the object. The default dimensioning data may include raw data captured by the dimensioning subsystem 106, such as the image data obtained by the image sensors 218, as well as processed data, such as the combined stereoscopic representation of the object. The default dimensioning data may further include other data (e.g., environmental data) detected by the dimensioning subsystem 106 or other sensors of the device 104 during the dimensioning operation.

In some examples, at block 305, prior to executing the default dimensioning method, the device 104 may output, at the output device 224, instructions for executing the default dimensioning method. For example, the device 104 may display text instructions, or produce an audio signal to prompt the operator to point the device 104 at the target object, and to provide an input at the input device 224 to initiate data capture by the dimensioning subsystem 106.

As described above, the default dimensioning method is generally a fast, computationally simple dimensioning method. Accordingly, the default dimensioning method may be performed during each dimensioning operation. Notably, at block 305, responsive to initiation of a subsequent dimensioning operation, the device 104 is configured to revert to the default dimensioning method, regardless of the dimensioning method ultimately used in previous dimensioning operations.

At block 310, the device 104 is configured to compute one or more quality metrics for the default dimensioning data. More particularly, the quality metrics represent an expected quality (e.g., an accuracy or reliability) of the default dimensioning data obtained via execution of the default dimensioning method.

Generally, the quality metrics may be computed based on: method metrics associated with the default dimensioning method itself, target metrics associated with attributes of the target object, environmental metrics associated with attributes of the immediate environment, combinations of the above, and the like. In other examples, other quality metrics affecting the default dimensioning data may also be utilized. More generally, the quality metrics are computed based on measurable parameters of the default dimensioning data which can aid in calculation of potential dimensioning efficacy and quality estimation.

In the present example, the method metrics associated with the stereoscopic dimensioning method may include a point cloud analysis of the stereoscopic representation of the object. Specifically, if the point cloud density is not sufficiently high, or the point cloud includes missing depth points at key locations, the computed dimensions may not be accurate due to a lack of available data. Accordingly, the quality metrics may include, for example, a score representing the predicted quality of the point cloud. In other examples, the raw point cloud density may be included as a quality metric. The method metrics associated with the stereoscopic dimensioning method may further include a percentage of missing points in the point cloud or depth map, a number of image frames to complete a dimensioning operation, and the like. The method metrics may further include metrics associated with the sensors of the dimensioning subsystem, including, but not limited to, a calibration state of the dimensioning subsystem (e.g., based on calibration states of the two or more image sensors), other sensor data, including sensor occlusion status, sensor pipeline stall, and the like. More generally, the method metrics may include metadata associated with the default dimensioning method.

The target metrics may include the size, reflectivity, profile, surface qualities, presence of nearby objects (non-singulation) or other parameters of the target object. For example, the device 104 may determine the size, reflectivity, profile or surface qualities of the target object based on the image data obtained at block 305. The memory 204 may store suitable ranges for the target object parameters. Specifically, the suitable ranges may represent ranges for which the default dimensioning method can generally obtain accurate dimensioning results. For example, if the size of the target object is relatively large within the frame of reference, or if the profile of the target object is irregular, stereoscopic dimensioning results may be poor.

The environmental metrics may include the ambient light or temperature, which may affect the efficacy of the default dimensioning method. The memory 204 may store suitable ranges for the ambient light and temperature or other environmental parameters. The suitable ranges may represent ranges for which the default dimensioning method can generally obtain accurate dimensioning results. For example, stereoscopic dimensioning results may be poor under low light conditions. Similarly, high or low ambient temperatures may shift optics and affect the calibration of the stereoscopic representation.

In some examples, the quality metrics may include a confidence level for the stereoscopic dimensioning method. The confidence level may represent a likelihood that the computed dimensions are within a threshold accuracy of the actual dimensions of the target object. The confidence level may be represented, for example, as a score, a percentage, or the like. For example, the device 104 may input the captured image data to a machine learning based analysis engine which is trained to predict the accuracy of a particular stereoscopic representation. In other examples, the confidence level may be based on a frame count analysis, wherein multiple image data frames are captured at block 305, and the confidence levels for the individual frames are combined to achieve an overall confidence level for the dimensioning operation.

The confidence level may be based, for example, on one or more of the above metrics (e.g., the point cloud density, size of the object, ambient lighting, or other suitable quality metrics) and may represent a combined quality metric. In further examples, combinations of the above and other analysis methods may contribute to the confidence level for the stereoscopic dimensioning method.

In other examples, other combined quality metrics may also be computed. For example, the device 104 may be configured to compute each of the above individual quality metrics as scores (e.g., represented as percentages), and a combined quality metric may represent the average score of the individual quality metrics.

At block 315, the device 104 is configured to compare the quality metrics to a threshold condition to determine whether the quality metrics exceed the threshold condition. The threshold condition may be defined in the quality evaluation rules stored in the memory 204. Specifically, to compare the quality metrics to the threshold condition, the device 104 may compare individual quality metrics to respective individual threshold conditions, and combined quality metrics to respective combined threshold conditions. Further, different combinations of individual threshold conditions and combined threshold conditions may contribute to the threshold condition (i.e., the overall threshold condition).

For example, the device 104 may first compare each individual quality metric to a respective individual threshold condition. That is, if any individual quality metric does not exceed its respective individual threshold condition, the determination at block 315 may be negative. If all the individual quality metrics exceed their respective individual threshold conditions, the device 104 may compare a combined quality metric to a combined threshold condition. If the combined quality metric does not exceed its combined threshold condition, the determination at block 315 may be negative. If the combined quality metric exceeds its combined threshold condition, the determination at block 315 may be affirmative.

In the present example, the device 104 may be configured to determine whether the point cloud density of the stereoscopic representation exceeds a threshold density, whether the ambient light and temperature are within respective suitable light and temperature ranges, and the like. The device 104 may further be configured to determine whether the computed confidence level for the stereoscopic dimensioning method exceeds a threshold confidence level. If any of the above metrics fall below their respective threshold values, or outside their respective threshold ranges, the device 104 may determine that the stereoscopic dimensioning method is unlikely to produce reliable, accurate results, and hence that the backup dimensioning method should be used.

In other examples, the device 104 may be configured to rely primarily on a combined quality metric, and only evaluate the individual quality metrics under certain conditions. For example, the device 104 may first compare the combined quality metric to a combined threshold condition. If the combined quality metric exceeds a first threshold value, the determination at block 315 may be affirmative. If the combined quality metric is below a second threshold value, the determination at block 315 may be negative. If the combined quality metric falls between the first threshold value and the second threshold value, the device 104 may be configured to determine whether any individual quality metric does not exceed a respective individual threshold condition. If any individual quality metric does not exceed a respective individual threshold condition, the determination at block 315 may be negative. In some examples, only a predefined subset of individual quality metrics may be compared to their respective individual threshold conditions (e.g., individual quality metrics having the highest correlation with efficacy of the default dimensioning method).

If the determination at block 315 is affirmative, the device 104 proceeds to block 320. At block 320, the device 104 computes the dimensions of the target object using the default dimensioning data obtained at block 305. That is, the device 104 dimensions the target object according to the default dimensioning method. In the present example, the device 104 computes the dimensions of the target object based on the stereoscopic representation of the object. In some examples, the device 104 may output the computed dimensions of the target object at the output device 224, send the computed dimensions of the target object to the server 101, or store the computed dimensions of the target object in the memory 204 for further processing.

If the determination at block 315 is negative, the device 104 proceeds to block 325. At block 325, the device 104 is configured to execute the backup dimensioning method to obtain backup dimensioning data. The backup dimensioning method may be executed during an alternative device-target object interaction sequence. That is, in the present example, the device 104 is configured to execute the optical with odometry-based dimensioning method. The associated device-target object interaction sequence may be for the operator to move the device 104 along or in vicinity of one or more sides of the target object. During the associated device-target object interaction sequence, the device 104 may control the tracking sensor 220 to track successive poses of the device 104 in a frame of reference and detect a plurality of dimensioning events associated with the object. In response to detecting each of the dimensioning events, the device 104 may generate a respective position in the frame of reference based on a current one of the poses. Finally, the device 104 may generate, based on the positions, an object boundary in the frame of reference. That is, the device 104 may dimension the target object by generating a virtual tape measure based on the movement of the device 104 relative to the target object. The object boundary may represent at least a portion of the backup dimensioning data produced by the optical with odometry-based dimensioning method. The backup dimensioning data may further include other data (e.g., environmental data) detected by the dimensioning subsystem 106 or other sensors of the device 104 during the dimensioning operation.

In some examples, at block 325, prior to executing the backup dimensioning method, the device 104 may output, at the output device 224, an indication of the change to the backup dimensioning method. Specifically, the indication may alert generated to indicate the change to the backup dimensioning method to prompt the operator to perform the alternative device-target object interaction sequence associated with the backup dimensioning method. For example, the indication may include a notification at a display of the output device 224, or an audio signal indicating the change. In some examples, the indication may further include instructions for executing the backup dimensioning method. For example, the device 104 may provide instructions prompting to the operator to move the device 104 around and over the target object for the optical with odometry-based dimensioning method.

In some examples, after obtaining backup dimensioning data from the backup dimensioning method, and prior to computing the dimensions of the target object based on the backup dimensioning data, the device 104 may be configured to return to block 310 to evaluate the backup dimensioning data. More particularly, at block 310, the device 104 may compute one or more quality metrics for the backup dimensioning data. At block 315, if the backup quality metrics exceed a backup threshold condition for the backup dimensioning data, the device 104 may compute the dimensions of the target object using the backup dimensioning data. If the backup quality metrics does not exceed the backup threshold condition, the device 104 may execute a further backup dimensioning method to obtain further dimensioning data. The device 104 may continue to iterate through blocks 325, 310 and 315 based on the backup dimensioning methods executable by the device 104. The device 104 may then compute the dimensions of the object based on further dimensioning data obtained by one of the backup dimensioning methods.

At block 330, the device 104 is configured to compute the dimensions of the target object using the backup dimensioning data obtained at block 325. That is, the device 104 dimensions the target object according to the backup dimensioning method. In some examples, the device 104 may output the computed dimensions of the target object at the output device 224, send the computed dimensions of the target object to the server 101, or store the computed dimensions of the target object in the memory 204 for further processing.

Figure 4:
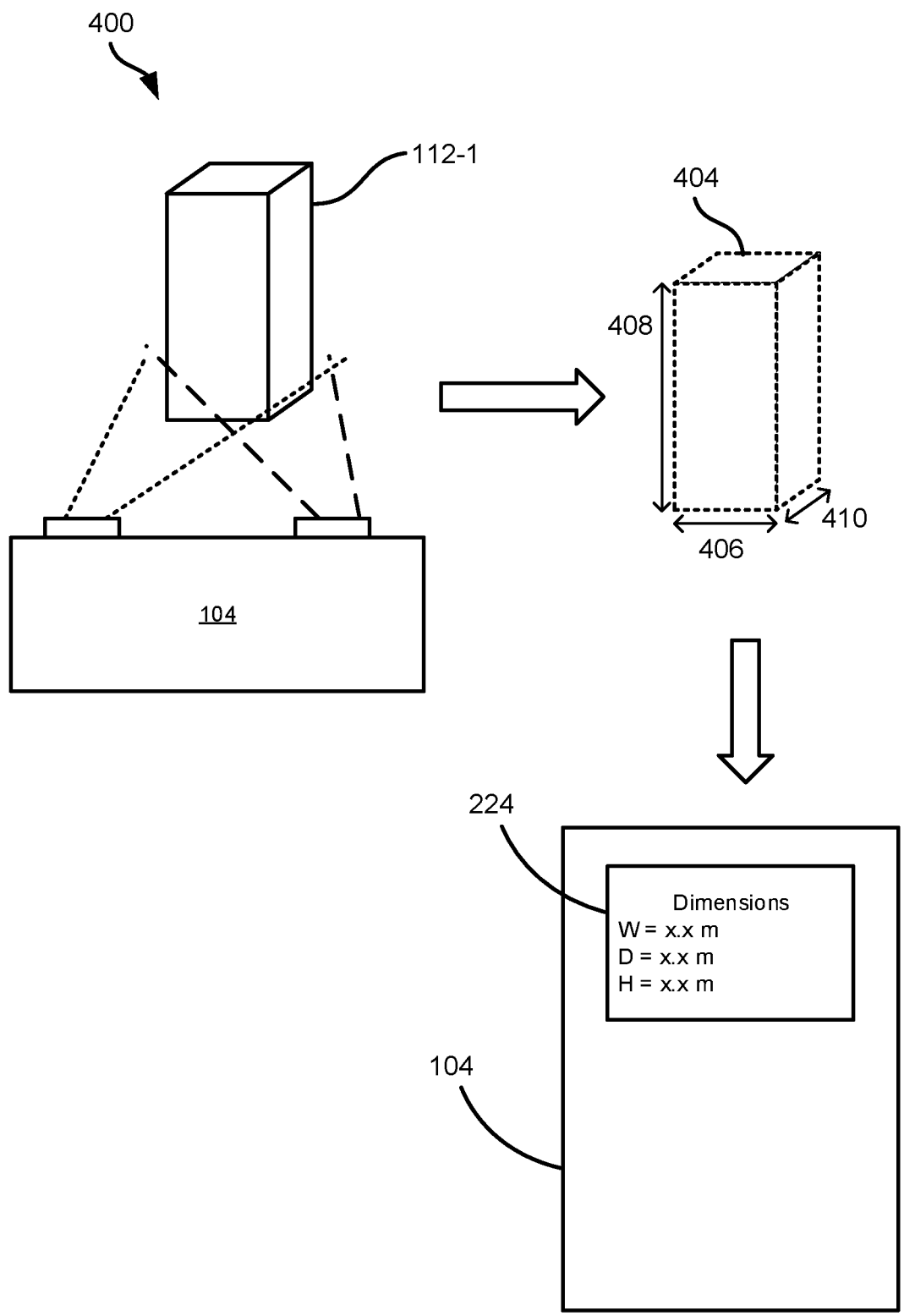
FIG. 4 is a schematic diagram illustrating an example performance of the method of FIG. 3.

Referring now to FIG. 4, a schematic diagram of a dimensioning operation 400 is depicted. Specifically, the dimensioning operation 400 will be described in conjunction with the performance of the method 300 by the device 104 to dimension the object 112-1.

An operator may first aim the device 104 towards the object 112-1 to be dimensioned, and provide an input, for example, at a trigger button to signal initialization of the dimensioning operation 400. At block 305, the device 104 executes the stereoscopic dimensioning method. Specifically, the device 104 controls the two image sensors 218-1 and 218-2 to capture image data representing the object 112-1 and combines them to form a stereoscopic representation 404.

At block 310, the device 104 computes quality metrics for the stereoscopic representation 404. For example, the device 104 may compute a point cloud density of the stereoscopic representation 404 and a confidence level for the stereoscopic dimensioning method. In the present example, the point cloud density may be high, as the flat surfaces of the object 112-1 lend themselves well to stereoscopic processing. Further, the confidence level for the stereoscopic dimensioning method may be high, based on the profile and shape of the target object 112-1. At block 315, the device 104 compares the point cloud density to a threshold density, and the confidence level to a threshold confidence level. Specifically, in the present example, the device 104 may determine that the threshold condition is exceeded.

Accordingly, at block 320, the device 104 computes a width 406, a height 408 and a depth 410 of the object 112-1 based on the stereoscopic representation 404. The device 104 may further display the dimensions 406, 408, 410 at the output device 224 of the device 104. As will be appreciated, the dimensions 406, 408, 410 may additionally be sent to the server 101 or one or more additional computing devices, and stored in the memory 204 for further processing.

Figure 5:
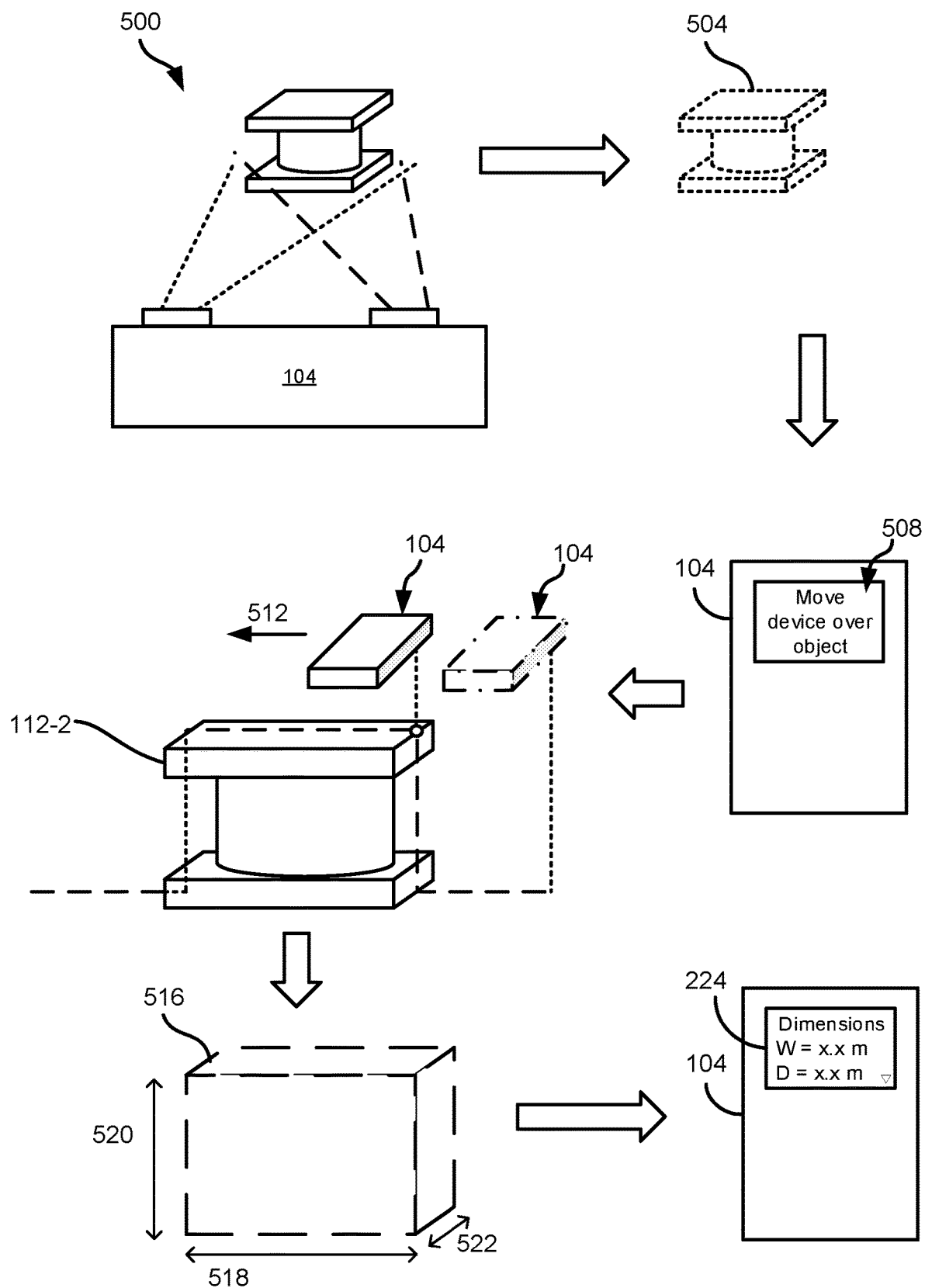
FIGS. 5 is a schematic diagram illustrating another example performance of the method of FIG. 3.

Referring now to FIG. 5, a schematic diagram of a dimensioning operation 500 is depicted. Specifically, the dimensioning operation 500 will be described in conjunction with the performance of the method 300 by the device 104 to dimension the object 112-2.

An operator may first aim the device 104 towards the object 112-2 to be dimensioned and provide an input, for example, at a trigger button to signal initialization of the dimensioning operation 500. At block 305, the device 104 executes the stereoscopic dimensioning method. Specifically, the device 104 controls the two image sensors 218-1 and 218-2 to capture image data representing the object 112-2 and combines them to form a stereoscopic representation 504.

At block 310, the device 104 computes quality metrics for the stereoscopic representation 504. For example, the device 104 may compute a point cloud density of the stereoscopic representation 504 and a confidence level for the stereoscopic dimensioning method. In the present example, the point cloud density may be sufficiently high, however, the confidence level for the stereoscopic dimensioning method may be low, based on the profile and shape of the target object 112-2. For example, the confidence level may be lowered based on different possible widths of the object 112-2 due to its irregular shape. Accordingly, at block 315, the device 104 compares the point cloud density to a threshold density and the confidence level to a threshold confidence level and determine that the threshold condition is not exceeded.

At block 325, the device 104 may provide an indication 508 of the change to the optical with odometry dimensioning method, including instructions to prompt the operator to perform the alternative device-target object interaction sequence associated with the backup optical with odometry dimensioning method. For example, the operator may move the device 104 so that the device 104 traverses the object 112-2 in several directions(e.g., in the direction 512 in the depicted example) in order to compute an object boundary 516. At block 330, the device 104 may use the object boundary 516 to compute a width 518, a height 520 and a depth 522 of the object 112-2. The device 104 may further display the dimensions 518, 520, 522 at the output device 224 of the device 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device for dimensioning an object comprising:
 a dimensioning subsystem configured to execute a default dimensioning method and a backup dimensioning method;
 a memory storing quality evaluation rules;
 a processor connected with the dimensioning subsystem and the memory, the processor configured to:
  control the dimensioning subsystem to execute the default dimensioning method to obtain default dimensioning data;
  compare a quality metric for the default dimensioning data to a threshold condition defined in the quality evaluation rules;
  when the quality metric exceeds the threshold condition, compute dimensions of the object based on the default dimensioning data; and
  when the quality metric does not exceed the threshold condition, control the dimensioning subsystem to execute the backup dimensioning method to obtain backup dimensioning data and compute the dimensions of the object based on the backup dimensioning data.

2. The computing device of claim 1, wherein the dimensioning subsystem includes at least two image sensors configured to capture image data representing the object, and wherein to execute the default dimensioning method, the processor is configured to:
   capture, at the at least two image sensors, the image data representing the object;
   obtain a stereoscopic representation of the object; and
   compute the dimensions of the object based on the stereoscopic representation..

3. The computing device of claim 2, wherein the quality metric is computed based on one or more of: a method metric associated with the default dimensioning method, a target metric associated with attributes of the object, and an environmental metric associated with attributes of an immediate environment of the object.

4. The computing device of claim 1, wherein to compare the quality metric to the threshold condition, the processor is configured to:
   compare individual quality metrics to respective individual threshold conditions; and
   compare combined quality metrics to respective combined threshold conditions.

5. The computing device of claim 1, wherein the dimensioning subsystem comprises a tracking sensor, and wherein to execute the backup dimensioning method, the processor is configured to:
   control the tracking sensor to track successive poses of the computing device in a frame of reference;
   detect a plurality of dimensioning events associated with the object;
   in response to detecting each of the dimensioning events, generate a respective position in the frame of reference based on a current one of the poses; and
   generate, based on the positions, an object boundary in the frame of reference as the backup dimensioning data.

6. The computing device of claim 1, wherein the processor is configured, prior to controlling the dimensioning subsystem to execute the backup dimensioning method, to generate an alert indicating a change to the backup dimensioning method to prompt an operator to perform an alternative device-target object interaction sequence associated with the backup dimensioning method.

7. The computing device of claim 1, wherein the processor is further configured to, responsive to initiation of a subsequent dimensioning operation, revert to the default dimensioning method.

8. The computing device of claim 1, wherein the processor is further configured, prior to computing the dimensions of the object based on the backup dimensioning data, to:
   compute a backup quality metric for the backup dimensioning data;
   when the backup quality metric exceeds a backup threshold condition for the backup dimensioning data, compute dimensions of the object based on the backup dimensioning data; and
   when the backup quality metric does not exceed the backup threshold condition, control the dimensioning subsystem to execute a further backup dimensioning method to obtain further dimensioning data; and
   compute the dimensions of the object based on the further dimensioning data.

9. A method for dimensioning an object, the method comprising:
   storing quality evaluation rules;
   controlling a dimensioning subsystem of a dimensioning device to execute a default dimensioning method to obtain default dimensioning data;
   comparing a quality metric for the default dimensioning data to a threshold condition defined in the quality evaluation rules;
   when the quality metric exceeds the threshold condition, computing dimensions of the object based on the default dimensioning data; and
   when the quality metric does not exceed the threshold condition, controlling the dimensioning subsystem to execute a backup dimensioning method to obtain backup dimensioning data and computing the dimensions of the object based on the backup dimensioning data.

10. The method of claim 9, wherein executing the default dimensioning method comprises:
    capturing image data representing the object;
    obtaining a stereoscopic representation of the object; and
    computing the dimensions of the object based on the stereoscopic representation.

11. The method of claim 10, wherein the quality metric is computed based on one or more of: a method metric associated with the default dimensioning method, a target metric associated with attributes of the object, and an environmental metric associated with attributes of an immediate environment of the object.

12. The method of claim 9, wherein comparing the quality metric to the threshold condition comprises:
    comparing individual quality metrics to respective individual threshold conditions; and
    comparing combined quality metrics to respective combined threshold conditions.

13. The method of claim 9, wherein executing the backup dimensioning method comprises:
    controlling a tracking sensor to track successive poses of the dimensioning device in a frame of reference;
    detecting a plurality of dimensioning events associated with the object;
    in response to detecting each of the dimensioning events, generating a respective position in the frame of reference based on a current one of the poses; and
    generating, based on the positions, an object boundary in the frame of reference as the backup dimensioning data.

14. The method of claim 9, further comprising, prior to controlling the dimensioning subsystem to execute the backup dimensioning method, generating an alert indicating a change to the backup dimensioning method to prompt an operator to perform an alternative device-target object interaction sequence associated with the backup dimensioning method.

15. The method of claim 9, further comprising, responsive to initiation of a subsequent dimensioning operation, reverting to the default dimensioning method.

16. The method of claim 9, further comprising, prior to computing the dimensions of the object based on the backup dimensioning data:
    comparing a backup quality metric for the backup dimensioning data to a backup threshold condition;
    when the backup quality metric exceeds the backup threshold condition, computing dimensions of the object based on the backup dimensioning data; and
    when the backup quality metric does not exceed the backup threshold condition, control the dimensioning subsystem to execute a further backup dimensioning method to obtain further dimensioning data; and compute the dimensions of the object based on the further dimensioning data.

17. A method for dimensioning an object, the method comprising:
storing quality evaluation rules;
controlling a dimensioning subsystem of a dimensioning device to execute a default dimensioning method to obtain default dimensioning data;
comparing a quality metric for the default dimensioning data to a threshold condition defined in the quality evaluation rules; and
selecting one of the default dimensioning method and a backup dimensioning method to compute dimensions of the object based on comparing the quality metric to the threshold condition.

18. The method of claim 17, wherein selecting one of the default dimensioning method and the backup dimensioning method comprises:
when the quality metric exceeds the threshold condition, selecting the default dimensioning method to compute the dimensions of the object; and
when the quality metric does not exceed the threshold condition, selecting the backup dimensioning method to compute the dimensions of the object.

19. The method of claim 18, wherein executing the default dimensioning method comprises:
capturing image data representing the object;
obtaining a stereoscopic representation of the object; and
computing the dimensions of the object based on the stereoscopic representation.

20. The method of claim 18, wherein selecting the backup dimensioning method comprises:
controlling a tracking sensor to track successive poses of the dimensioning device in a frame of reference;
detecting a plurality of dimensioning events associated with the object;
in response to detecting each of the dimensioning events, generating a respective position in the frame of reference based on a current one of the poses; and
generating, based on the positions, an object boundary in the frame of reference as backup dimensioning data; and
computing the dimensions of the object based on the backup dimensioning data.

21. The method of claim 20, further comprising, prior to computing the dimensions of the object based on the backup dimensioning data:
comparing a backup quality metric for the backup dimensioning data to a backup threshold condition;
when the backup quality metric exceeds the backup threshold condition, computing dimensions of the object based on the backup dimensioning data; and
when the backup quality metric does not exceed the backup threshold condition, control the dimensioning subsystem to execute a further backup dimensioning method to obtain further dimensioning data and compute the dimensions of the object based on the further dimensioning data.

22. The method of claim 18, further comprising, prior to selecting the backup dimensioning method, alerting an operator to a change to the backup dimensioning method to allow the operator to perform an alternative device-target object interaction sequence associated with the backup dimensioning method.

23. The method of claim 17, wherein the quality metric is computed based on one or more of: a method metric associated with the default dimensioning method, a target metric associated with attributes of the object, and an environmental metric associated with attributes of an immediate environment of the object.

24. The method of claim 17, wherein comparing the quality metric to the threshold condition comprises:
comparing individual quality metrics to respective individual threshold conditions; and
comparing combined quality metrics to respective combined threshold conditions.

25. The method of claim 17, further comprising, responsive to initiation of a subsequent dimensioning operation, reverting to the default dimensioning method.

26. A method for dimensioning an object, the method comprising:
controlling a dimensioning subsystem of a dimensioning device to execute a default dimensioning method during a first device-target object interaction sequence to obtain default dimensioning data;
selecting one of the default dimensioning method and a backup dimensioning method based on the default dimensioning data to compute dimensions of the object;
when the backup dimensioning method is selected, generating an alert indicating a change to the backup dimensioning method to prompt an operator to perform an alternative device-target object interaction sequence associated with the backup dimensioning method and controlling the dimensioning subsystem to execute the backup dimensioning method during the alternative device-target object interaction sequence.

27. The method of claim 26, wherein selecting one of the default dimensioning method and the backup dimensioning method comprises comparing a quality metric for the default dimensioning data to a threshold condition.

28. The method of claim 27, wherein selecting one of the default dimensioning method and the backup dimensioning method further comprises:
when the quality metric exceeds the threshold condition, selecting the default dimensioning method to compute the dimensions of the object; and
when the quality metric does not exceed the threshold condition, selecting the backup dimensioning method to compute the dimensions of the object.

29. The method of claim 26, wherein executing the default dimensioning method comprises:
capturing image data representing the object;
obtaining a stereoscopic representation of the object; and
computing the dimensions of the object based on the stereoscopic representation.

30. The method of claim 26, wherein executing the backup dimensioning method comprises:
controlling a tracking sensor to track successive poses of the dimensioning device in a frame of reference;
detecting a plurality of dimensioning events associated with the object;
in response to detecting each of the dimensioning events, generating a respective position in the frame of reference based on a current one of the poses; and
generating, based on the positions, an object boundary in the frame of reference as backup dimensioning data; and
computing the dimensions of the object based on the backup dimensioning data.

31. The method of claim 26, further comprising, responsive to initiation of a subsequent dimensioning operation, reverting to the default dimensioning method.

* * * * *